B. J. NOYES.
ELECTRIC STARTING DEVICE FOR INTERNAL COMBUSTION ENGINES.
APPLICATION FILED APR. 9, 1913.

1,237,215.

Patented Aug. 14, 1917.

Witnesses:
H. B. Davis
C. Doyle

Inventor:
Bernice J. Noyes
By Noyes & Harriman
Attys.

UNITED STATES PATENT OFFICE.

BERNICE J. NOYES, OF BOSTON, MASSACHUSETTS.

ELECTRIC STARTING DEVICE FOR INTERNAL-COMBUSTION ENGINES.

1,237,215. Specification of Letters Patent. Patented Aug. 14, 1917.

Application filed April 9, 1913. Serial No. 759,847.

*To all whom it may concern:*

Be it known that I, BERNICE J. NOYES, a citizen of the United States, residing at Boston, in the county of Suffolk and State of Massachusetts, have invented an improvement in Electric Starting Devices for Internal-Combustion Engines, of which the following is a specification.

This invention relates to electric starting-devices for internal combustion engines adapted for manual control involving storage-batteries and a dynamo-electric machine, adapted to operate either as a motor or a generator; and has for its object the employment of simple forms of switches and a hand-operated controller therefor, for controlling the arrangement of the batteries whereby they may be arranged in series relation for starting purposes and in multiple relation for charging purposes; and also the employment of simple forms of switches controlling the circuit, there being two such circuit-controlling switches provided, one for closing the circuit when the batteries are arranged in multiple relation for charging purposes, and the other for closing the circuit when the batteries are arranged in series relation for starting purposes. The charging-switch is operatively connected with the switch-controller so that when said controller is moved to arrange the batteries in multiple relation for charging purposes the circuit will be closed, thereby admitting of the batteries being charged, and when said controller is moved to arrange the batteries in series relation for starting purposes, the circuit will be opened. The starting-switch is so constructed and associated with the switch-controller that in case it shall be operated to close the circuit at a time when the switch-controller has been moved to arrange the batteries in multiple relation, it will automatically return said switch-controller to normal position, to thereby arrange the batteries in series relation, and the charging-switch, which is operatively connected with said switch, will be correspondingly moved.

The invention also has for its object the provision of a lamp-circuit which is connected with one of the storage-batteries, and a resistance or other means adapted to be included in the circuit for causing the lamps to glow dimly whenever desired.

Figure 1:
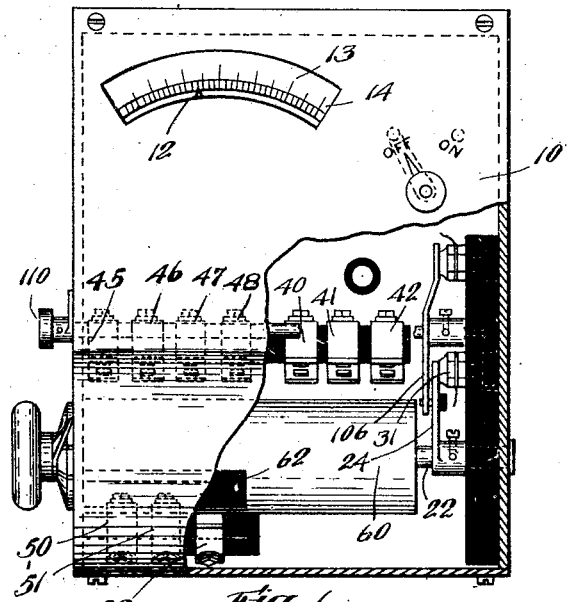
Figure 1 is a front elevation of a switch-box, containing the switches and switch-controller, the case being broken away to expose the parts within.

10 represents the box or inclosing-case. Said box contains an instrument such as an ampere-hour meter having an indicating-hand 12 arranged to move over a dial 13, which is exposed through an opening 14 in the front wall of the box, (which opening may be closed by a glass plate) for indicating the condition of the storage-batteries. 15 represents a dynamo-electric machine adapted to be driven by the engine for charging purposes, and also to turn the shaft of the engine in any usual or suitable manner, and 16, 17, 18, 19, represent four storage-batteries, each containing as many cells as desired. Said storage-batteries are designed to be arranged in series relation to supply current for driving the dynamo, and in multiple relation to receive a charging-current from the dynamo.

A double-pole switch of any usual or suitable construction is arranged within the case for closing the circuit when the batteries are arranged in multiple relation, and which serves as the charging-switch, and comprises switch-arms 24, 25, pivoted respectively at 22, 23, and arranged for engagement with the contacts 28, and 29, when in one position and with contacts 28 and 31 when in another position.

A two-point switch of any usual or suitable construction is also arranged within the case for closing the circuit when the storage-batteries are arranged in series relation, and which serves as the starting-switch, and comprises a switch-arm 100, pivoted at 101, and arranged for engagement with a contact 102, when in one position and with a contact 103 when in another position.

As here shown, the circuit which is controlled by said switches comprises circuit-wires 20, 21, leading from the motor-generator to the pivot-shafts 22, 23, of the switch arms 24, 25 of the charging-switch; a circuit-wire 26 leading from the switch-arm contact 28 to one end of the several storage-batteries which latter are connected together in series by connecting-wires, a circuit-wire 105 leading from the switch-arm contact 29 to the pivot-shaft 101 of the starting-switch 100; a circuit-wire 27 leading from the switch-arm contact 103 of the starting-switch to the storage-batteries; a circuit-wire 30 leading from a switch-arm contact 31 of the charging-switch; numerous branch circuit-wires 32, 33, 34, 35, leading from the circuit-wire 30, to the connecting wires between the storage-batteries, and numerous branch circuit-wires 36, 37 and 38, leading from the circuit-wire 26 to the connecting-wires between the several storage-batteries.

Figure 2:
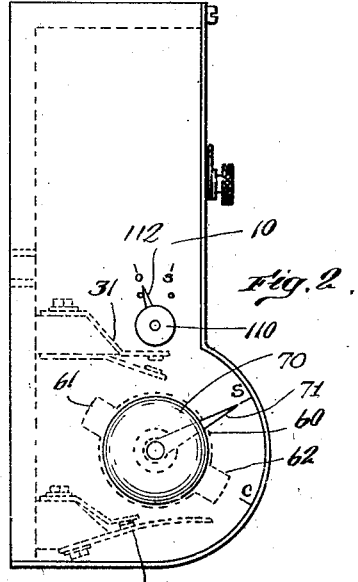
Fig. 2 is a side elevation of the switch-box shown in Fig. 1.

Numerous switches are provided for controlling the branch circuit-wires and also the connecting-wires between the several batteries, and, as here shown, switches 40, 41, and 42 are arranged in the branch circuit-wires 36, 37 and 38, and switches 45, 46, 47 and 48 are arranged in the branch circuit-wires 32, 33, 34 and 35, constituting one set of switches, and switches 50, 51 and 52 are arranged in the connecting circuit-wires between the several batteries, constituting another set of switches. These switches are or may be made alike and each consists of a pair of resilient contact-members mounted on insulated supports, and they are arranged in two rows, those of one set being arranged in one row and those of the other set in another row. Both sets of switches are designed to be controlled manually, and, as here shown a rotatable cylinder 60 is provided, having arranged on it longitudinally extended ribs 61, 62, for engagement with the resilient contact-members of the several switches, as for instance, those switches which are operated by the rib 61, as 40, 41, 42, 45, 46, 47 and 48 are normally open and are adapted to be closed by engagement therewith of the rib 61, and those switches which are operated by the rib 62, as 50, 51 and 52, are normally closed and are adapted to be opened by the engagement therewith of said rib 62. When the cylinder is disposed with its ribs 61 and 62 both free from engagement with the switches, as represented by dotted lines Fig. 2, the storage-batteries are arranged in series relation; and when the cylinder is turned to the position represented in Fig. 3, and the two sets of switches operated simultaneously, the storage-batteries will be arranged in multiple relation.

The charging-switch is operatively connected with said cylinder to be operated in conjunction with it, and, as here shown, said cylinder is secured to the pivot-shaft 22 of the charging-switch, and as the cylinder is turned the charging-switch will be correspondingly moved, thereby to open and close the circuit. When the cylinder is in the position represented by dotted lines Fig. 2, the charging-switch will occupy the position shown in Fig. 5, and the circuit will be open, but when said cylinder is moved to a position to cause its ribs to engage the two sets of switches, then the pivot-shaft 22 will be correspondingly turned and the switch-arm 24 moved from the contact 28 to the contact 31 and the switch-arm 25, which is connected with the switch-arm 24, is moved from the contact 29 to the contact 28, as shown in Fig. 3, thereby closing the circuit with the batteries arranged in multiple relation.

Figure 3:
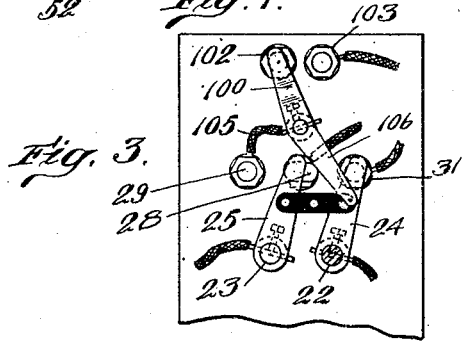
Fig. 3 is a detail view of the charging and starting switches in the position they will occupy when the batteries are arranged in multiple for charging purposes, and the charging-switch is operated to close the circuit.
Figure 4:
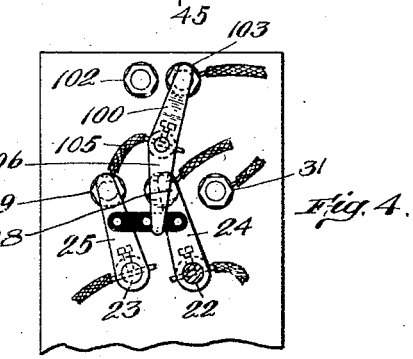
Fig. 4 is a similar detail view of the charging and starting switches in the position they will occupy when the batteries are arranged in series relation and the starting-switch is operated to close the circuit.
Figure 5:
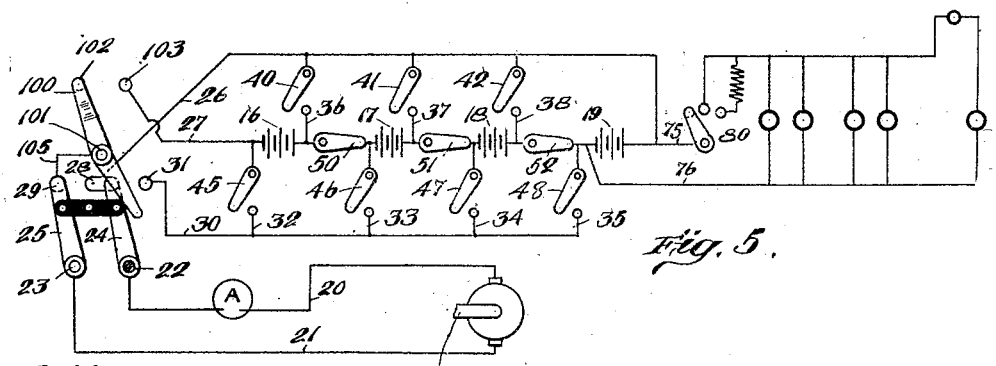
Fig. 5 is a diagram of the circuits.

When it is desired to drive the dynamo to in turn rotate the shaft of the engine for the purpose of starting it, the starting switch-arm 100 will be moved from the position shown in Figs. 3 and 5, to the position shown in Fig. 4, whereupon the circuit-wire 27 will be connected with the circuit-wire 26 through the circuit-wire 105 and the charging-switch.

When it is desired to move the starting-switch for this purpose, it is necessary that the storage-batteries shall be arranged in series relation and in case the charging-switch has been moved from its normal position for charging purposes, it must be restored to normal, and herein an arm 106 is connected to the pivot-shaft 101 of the starting-switch, which extends over the charging-switch so as to engage a pin 107 on the connecting-bar of said charging-switch, thereby to automatically restore said charging-switch to normal.

It is designed and intended that both the charging-switch and the starting-switch shall be manually operated, and, as here shown, the shaft of the cylinder 60 extends through the wall of the case, and has arranged on its exposed end-portion a knob 70 having an indicator-hand 71 coöperating with suitable indicators on the wall of the case; and the shaft 101 of the starting-switch is also extended through the wall of the case and has arranged on its exposed end-portion a knob 110, having an indicating-hand 112, coöperating with suitable indicators on the wall of the case. Thus each switch may be turned when desired.

A lamp-circuit is here shown comprising circuit-wires 75, 76, connected to opposite sides of one of the storage-batteries, said circuit having lamps arranged therein in multiple, as shown, and a hand-switch 80, is provided for controlling them, either through a branch-circuit containing a resistance for causing the lamps to glow dimly, or through a branch-circuit which does not contain a resistance for causing the lamps to glow brightly.

I claim:—

1. In an electric starting-device for internal combustion engines, the combination with a plurality of storage-batteries, a dynamo, a circuit connecting them, and a plurality of switches for connecting said storage-batteries in circuit in series and in multiple relation, of a rotatable cylinder having ribs arranged on it to operate said switches, and having means operatively connected with it by which to rotate it, a charging-switch operatively connected with said controller for closing the circuit when the controller is moved to connect the storage batteries in multiple relation, and a switch for closing the circuit when the batteries are connected in series relation, substantially as described.

2. In an electric starting-device for internal combustion engines, the combination with a plurality of storage-batteries, a dynamo, a circuit connecting them, and two sets of switches, the switches of one set being normally biased to closed position and the switches of the other set being normally biased to open position and said switches being arranged in the circuit and normally disposed to connect said storage batteries in series relation and when moved to connect said storage-batteries in multiple relation, of a rotatable controller having switch-engaging ribs, a charging-switch operatively connected with said controller for closing the circuit when the controller is moved to connect the storage-batteries in multiple relation, and a switch for closing the circuit when the batteries are connected in series relation, substantially as described.

3. In an electric starting-device for internal combustion engines, the combination with a plurality of storage-batteries, a dynamo, a circuit connecting them, and a plurality of switches for connecting said storage-batteries in circuit in series and in multiple relation, of a controller for all of said switches, a charging-switch operatively connected with said controller for closing the circuit when the controller is moved to connect the storage-batteries in multiple relation, and a starting-switch for closing the circuit when the storage-batteries are connected in series relation having means for engaging the charging-switch to restore said charging-switch to normal, substantially as described.

4. In an electric starting device for internal combustion engines, the combination with a plurality of storage batteries, a dynamo, a circuit connecting them, and a plurality of switches for connecting said storage batteries in circuit, in series, and in multiple relation, of a controller for all of said switches, a charging switch operatively connected with said controller and normally disposed in open circuit position, said charging switch being movable with the controller for closing the circuit when the controller is moved to connect the storage batteries in multiple relation, and a switch operable independently of the controller and charging switch, for moving the charging switch back to normal position and for connecting the charging switch in the series circuit of the batteries.

5. In an electric starting device for internal combustion engines, the combination with a plurality of storage batteries, a dynamo, a circuit connecting them, and a plurality of switches for connecting said storage batteries in circuit, in series, and in multiple relation, and a controller for all of said switches, a double-throw charging switch having three contacts, a pair of which are connected in the multiple circuit of the batteries, one side of said multiple circuit constituting one side of said series circuit, a fixed contact in the other side of said series circuit, and a switch movable independently of the charging switch for closing the circuit between the third contact of the charging switch and the said fixed contact of the series circuit, said charging switch being normally disposed in open circuit position, but being movable with the controller for closing the circuit through the dynamo by engaging the first-mentioned pair of contacts, when the controller is operated to connect the batteries in multiple, said charging switch being also movable in response to the movements of the said switch for engagement with one of said pair of fixed contacts and with the third contact when the said switch is moved to connect the third contact with the other side of the series circuit.

In testimony whereof, I have signed my name to this specification, in the presence of two subscribing witnesses.

BERNICE J. NOYES.

Witnesses:
C. DOYLE,
H. B. DAVIS.